(12) United States Patent
Basta et al.

(10) Patent No.: US 8,388,265 B2
(45) Date of Patent: Mar. 5, 2013

(54) WATERCRAFT LIFT SYSTEM

(76) Inventors: Samuel T. Basta, Bellevue, WA (US); Gene Thompson, Bellevue, WA (US)

( * ) Notice: Subject to any disclaimer, the term of this patent is extended or adjusted under 35 U.S.C. 154(b) by 0 days.

(21) Appl. No.: 13/415,791

(22) Filed: Mar. 8, 2012

(65) Prior Publication Data
US 2012/0224919 A1 Sep. 6, 2012

Related U.S. Application Data

(63) Continuation of application No. 12/692,520, filed on Jan. 22, 2010.

(60) Provisional application No. 61/146,645, filed on Jan. 22, 2009, provisional application No. 61/146,985, filed on Jan. 23, 2009.

(51) Int. Cl.
*E02D 17/20* (2006.01)

(52) U.S. Cl. .......................................................... 405/3

(58) Field of Classification Search .................. 405/1–4, 405/7; 114/44, 45, 48; 280/414.1–414.3
See application file for complete search history.

(56) References Cited

U.S. PATENT DOCUMENTS

| | | | |
|---|---|---|---|
| 704,358 A * | 7/1902 | McCullough | 405/7 |
| 779,600 A * | 1/1905 | Hickler | 405/7 |
| 3,021,965 A | 2/1962 | Harvey | |
| 3,088,545 A | 5/1963 | Meyer | |
| 3,362,172 A | 1/1968 | Rutter | |
| 3,632,138 A | 1/1972 | Whiteley | |
| 3,841,442 A | 10/1974 | Erickson et al. | |
| 3,863,890 A | 2/1975 | Ruffing | |
| 4,022,027 A | 5/1977 | Tetzner | |
| 4,024,972 A | 5/1977 | Hobson | |
| 4,027,492 A | 6/1977 | Carpenter | |
| 4,072,119 A | 2/1978 | Williams | |
| 4,222,140 A | 9/1980 | Olewinski et al. | |
| 4,641,595 A | 2/1987 | Pritchett | |
| 1,671,729 A | 6/1987 | McFarland | |
| 4,678,366 A | 7/1987 | Williamson | |
| 4,787,327 A | 11/1988 | Porter | |
| 4,832,280 A | 5/1989 | Haland et al. | |
| 4,850,741 A | 7/1989 | Timmerman | |
| 4,895,479 A | 1/1990 | Michaelsen et al. | |
| 4,934,298 A | 6/1990 | Pritchett | |
| 4,973,094 A | 11/1990 | Tana et al. | |
| 4,983,067 A | 1/1991 | Montgomery | |
| 5,007,121 A | 4/1991 | McEathron | |
| D317,790 S | 6/1991 | Hey | |
| 5,090,842 A | 2/1992 | Montgomery | |
| 5,133,570 A * | 7/1992 | Godbersen | 280/414.1 |
| 5,143,182 A | 9/1992 | Basta | |
| 5,158,419 A | 10/1992 | Kempf et al. | |
| 5,184,913 A | 2/1993 | Meriwether | |

(Continued)

FOREIGN PATENT DOCUMENTS
GB 694510 9/1953
GB 2099789 12/1982

*Primary Examiner* — Sunil Singh
*Assistant Examiner* — Kyle Armstrong
(74) *Attorney, Agent, or Firm* — Michael R. Schacht; Schacht Law Office, Inc.

(57) ABSTRACT

A watercraft lifting system includes a bunk rail assembly, an intermediate frame assembly, a base assembly and a ground support assembly. The bunk rail assembly includes a bunk rail coupled to a load distribution member. The load distribution member is received by the bunk rail such that the bunk rail may rotate by at least a limited amount relative to the load distribution member. The bunk rail may slideably receive a bunk cushion and form a channel therewith for sandwiching a rigid structural member (e.g., a board). The watercraft lifting system may also include contoured clamps that cooperate to distribute and transfer load between frame members. In one embodiment, the contoured clamps include parabolically-shaped inner surfaces.

17 Claims, 10 Drawing Sheets

U.S. PATENT DOCUMENTS

| | | | |
|---|---|---|---|
| 5,184,914 | A | 2/1993 | Basta |
| 5,211,124 | A | 5/1993 | Reiser |
| 5,240,347 | A | 8/1993 | Williams et al. |
| 5,275,505 | A | 1/1994 | Wilcox |
| 5,311,970 | A | 5/1994 | Basta |
| 5,316,329 | A * | 5/1994 | MacKarvich ............ 280/414.1 |
| 5,391,932 | A | 2/1995 | Small et al. |
| 5,485,798 | A | 1/1996 | Samoian et al. |
| 5,543,837 | A | 8/1996 | Aoki et al. |
| 5,620,154 | A | 4/1997 | Hey |
| 5,649,417 | A | 7/1997 | Hey |
| 5,678,663 | A | 10/1997 | Watanabe et al. |
| 5,687,663 | A | 11/1997 | Wahlstrand |
| 5,725,181 | A | 3/1998 | Hey |
| 5,860,379 | A | 1/1999 | Moody |
| 5,860,623 | A | 1/1999 | Dunstan et al. |
| 5,888,019 | A | 3/1999 | Quastad |
| 5,890,835 | A | 4/1999 | Basta et al. |
| 5,908,264 | A | 6/1999 | Hey |
| 5,909,877 | A | 6/1999 | Bour |
| 5,919,000 | A | 7/1999 | Unkle |
| 6,076,478 | A | 6/2000 | Siegmann |
| 6,113,124 | A * | 9/2000 | Chambers ................ 280/414.1 |
| 6,131,528 | A | 10/2000 | Meek et al. |
| 6,131,850 | A | 10/2000 | Hey et al. |
| 6,250,662 | B1 * | 6/2001 | Poppell .................... 280/414.3 |
| 6,318,929 | B1 | 11/2001 | Basta |
| 6,453,837 | B1 * | 9/2002 | Arbaugh et al. ............ 114/219 |
| 6,543,837 | B2 | 4/2003 | Fischer et al. |
| 6,612,775 | B1 | 9/2003 | Hewitt |
| D484,086 | S | 12/2003 | Davidson et al. |
| D484,450 | S | 12/2003 | Davidson et al. |
| D487,423 | S | 3/2004 | Davidson et al. |
| 6,752,096 | B2 | 6/2004 | Elson et al. |
| 6,752,097 | B1 | 6/2004 | Elson et al. |
| 6,752,099 | B1 | 6/2004 | Crifase et al. |
| 6,823,809 | B2 | 11/2004 | Hey |
| 6,830,410 | B2 | 12/2004 | Davidson et al. |
| 6,837,651 | B1 | 1/2005 | Basta |
| D503,692 | S | 4/2005 | Basta |
| 6,976,442 | B2 | 12/2005 | Hey et al. |
| 7,021,861 | B2 | 4/2006 | Basta |
| 7,210,420 | B1 | 5/2007 | Basta |
| 7,226,041 | B2 | 6/2007 | Ledford |
| 7,246,970 | B2 | 7/2007 | Hey |
| 7,404,353 | B2 | 7/2008 | Kriegsmann |
| 7,527,014 | B2 | 5/2009 | Hey et al. |
| 7,587,971 | B2 | 9/2009 | Kriegsmann |
| 7,712,425 | B2 | 5/2010 | Basta |
| 2002/0132537 | A1 | 9/2002 | Hey |
| 2004/0126185 | A1 * | 7/2004 | Davidson et al. ................ 405/7 |
| 2004/0184883 | A1 | 9/2004 | Basta |
| 2005/0013663 | A1 | 1/2005 | Basta |
| 2005/0016438 | A1 | 1/2005 | Hey et al. |
| 2005/0123351 | A1 | 6/2005 | Basta |
| 2005/0139141 | A1 | 6/2005 | Hey et al. |
| 2005/0166821 | A1 | 8/2005 | McKenzie |
| 2005/0183648 | A1 | 8/2005 | Basta |
| 2005/0235893 | A1 * | 10/2005 | Hey et al. ........................ 114/44 |
| 2005/0252542 | A1 | 11/2005 | Basta |
| 2005/0260036 | A1 | 11/2005 | Emond |
| 2006/0147268 | A1 | 7/2006 | Hey |
| 2006/0153643 | A1 | 7/2006 | Basta |
| 2006/0225635 | A1 | 10/2006 | Basta |
| 2007/0045984 | A1 | 3/2007 | Remedios et al. |
| 2007/0169675 | A1 | 7/2007 | Basta |
| 2007/0295379 | A1 | 12/2007 | Basta |
| 2008/0008528 | A1 | 1/2008 | Hey et al. |
| 2009/0007770 | A1 | 1/2009 | Kriegsmann |
| 2009/0190994 | A1 | 7/2009 | Hey et al. |
| 2009/0191000 | A1 | 7/2009 | Kloster et al. |
| 2009/0194014 | A1 | 8/2009 | Kloster et al. |
| 2009/0202300 | A1 | 8/2009 | Basta |
| 2009/0241824 | A1 | 10/2009 | Basta |

* cited by examiner

WATERCRAFT LIFT SYSTEM

PRIORITY CLAIM

This application is a continuation of U.S. patent application Ser. No. 12/692,520 filed Jan. 22, 2010, the subject matter of which is incorporated herein by reference in its entirety.

U.S. patent application Ser. No. 12/692,520 claims priority to U.S. Provisional Patent Application Nos. 61/146,645 and 61/146,985 filed on Jan. 22, 2009 and Jan. 23, 2009, respectively, and the subject matter of each application is incorporated herein by reference in its entirety.

FIELD OF THE INVENTION

This invention relates generally to a watercraft lift system, and more specifically relates to a watercraft lift having load distribution devices arranged on various portions of a lift frame assembly.

BACKGROUND OF THE INVENTION

Conventional watercraft lift systems typically include a kinematically linked frame assembly that generally takes the shape of a parallelogram. By way of example, U.S. Pat. No. 4,895,479 describes a parallelogram-shaped lift having a stationary base coupled to parallel links, which in turn are coupled to a lift platform for supporting a watercraft. As described in U.S. Patent Publication No. 2006/0147268, one or more hydraulic actuators may be coupled to cross members of the lift such that pressurization or depressurization of the actuator moves the lift from a collapsed configuration to a raised configuration, or vice-versa. Other versions of conventional watercraft lift systems include a cable-pulley system for moving the lift between the collapsed and raised configurations.

Conventional watercraft lift systems, whether having a parallelogram-shape or not, have frame members that are typically pin-pin connected. For example, the links are pin-connected to the base and bunk (e.g., upper rail assembly), respectively.

SUMMARY OF THE INVENTION

The present invention generally relates to a watercraft lifting system having one or more devices or assemblies for distributing a weight of the watercraft more efficiently into a frame system that may include a bunk rail assembly, an intermediate frame assembly and a base frame assembly. As discussed above, the conventional pin-pin connections or other hard-point connections used in watercraft lift systems often require structural reinforcements around the connection point. Without such reinforcements, these connection points, which are often in contact with various types of water (salt, brine, river, etc.), become the locus regions for various types of structural failures, such as, but not limited to corrosion and fatigue.

In accordance with an aspect of the invention, a bunk rail assembly for a watercraft lifting system includes a rail having a length sufficient to support a desired type of watercraft; and a load distribution member having a bearing surface shaped to be closely received by a correspondingly shaped surface of the rail, wherein the respective surfaces permit rotation of the rail relative to the load distribution member, wherein the load distribution member is coupled to the rail with a fastener assembly arranged in a through slot formed in a wall of the load distribution member.

In accordance with another aspect of the invention, a watercraft lifting system includes a base frame assembly; an intermediate frame assembly pivotally coupled to the base frame assembly; and a bunk rail assembly pivotally coupled to the intermediate frame assembly, the bunk rail assembly having a rail engaged with a load distribution member that is pin-connected to the intermediate frame assembly, the load distribution member having a periphery surface shaped to be closely received within a correspondingly shaped inner surface of the rail.

In accordance with yet another aspect of the invention, a clamping assembly for a watercraft lifting system includes a load transferring member; a load receiving member having an outer tapered surface; and a clamping member having opposing flanges extending from a base portion, an outer surface of at least one opposing flange attachable to the load transferring member; an inner surface defined by the flanges and base portion being complementarily tapered to closely nest with the outer tapered surface of the load receiving member.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

As will be described in further detail below, at least one embodiment of the invention includes a watercraft lifting system with a moveable frame assembly and where at least some of the frame members are coupled together using load distribution and/or clamping devices. The moveable frame assembly necessitates some type of pin-connection between frame members. However, these pin-connection joints are also the locations where weight and other forces are transferred through the frame assembly. As a result, the pin-connection joints can be a common maintenance and/or failure region. Thus, the load distribution and/or clamping devices for the watercraft lifting system described herein advantageously provide an improved load transition and consequently reduce local stresses around the pin-connection regions. In turn, the reduced local stresses improves the overall life of the watercraft lifting system, substantially reduces the need to replace an entire frame member in the event of a wear, corrosion or other issue, and reduces the need to structurally reinforce the pin-connection region (e.g., the frame members can be produces a uniform thickness extrusions).

Figure 1:
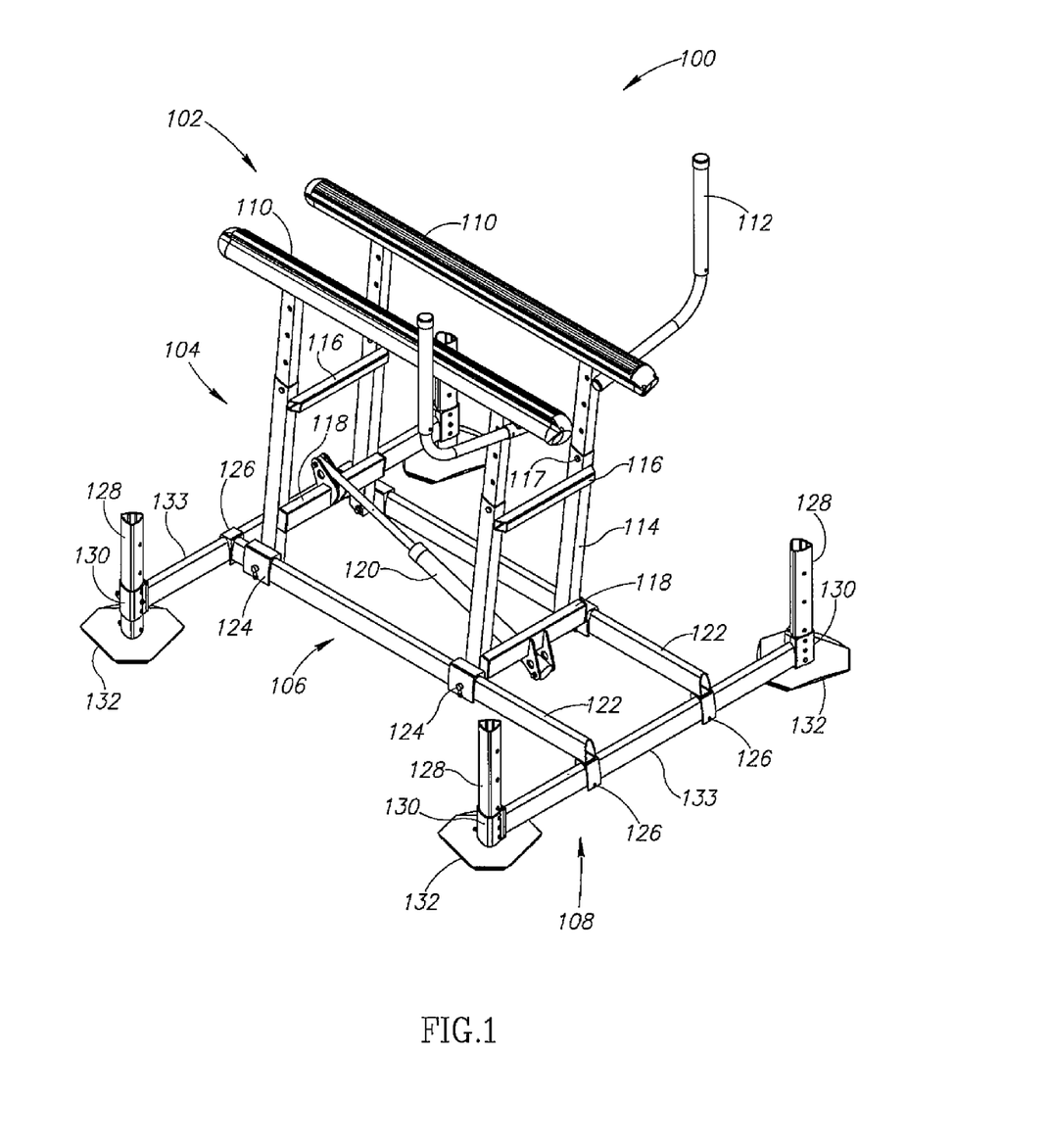
FIG. 1 is a top, right isometric view of a watercraft lifting system in an upright configuration according to an embodiment of the present invention.
Figure 2:
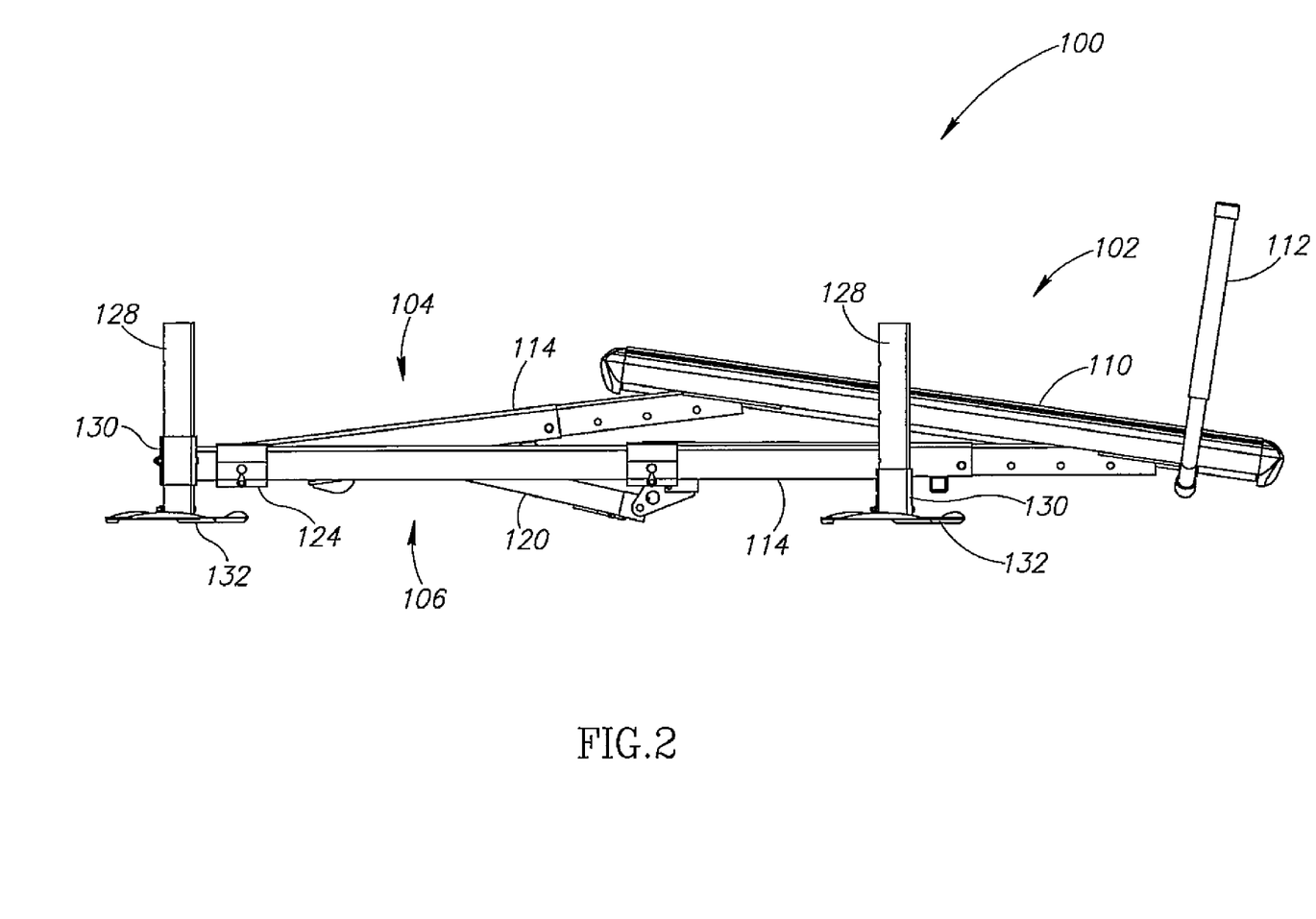
FIG. 2 is a side elevational view of the watercraft lifting system of FIG. 1 in a stowed configuration.

FIGS. 1 and 2 show a watercraft lifting system 100 having a bunk rail assembly 102, an intermediate link or frame assembly 104, a base assembly 106 and a ground support assembly 108. The watercraft lifting system 100 may be used for lifting a variety of watercraft, such as, but not limited to, boats, jet skis, float planes, etc. The various frame members of the watercraft lifting system 100 may take the form of extrusions made from metal, fiber-reinforced composites, or some other material. In the illustrated embodiment, the watercraft lifting assembly 100 takes the form of a parallelogram-type lift in an upright configuration (FIG. 1) and in a stowed configuration (FIG. 2).

The bunk rail assembly 102 includes bunk rails 110 and hull supports 112. The bunk rails 110 will be described in greater detail below. The hull supports 112 may be sized and configured based on the type of watercraft to be lifted and/or transported by the watercraft lifting system 100.

The intermediate frame assembly 104 includes telescoping frame members or links 114 that may be structurally stabilized by upper cross members 116 and lower cross members 118. Similar to the frame members, the cross members 116, 118 may be extrusions made from a desired material. The telescoping links 114 may be coupled together with a detent pin 117 that allows the links 114 to be adjustably lengthened or shortened depending on a water depth, for example. In the illustrated embodiment, an actuator 120, which may take the form of a hydraulic piston-cylinder type actuator, is coupled to the lower cross members 118. Pressurization of the actuator 120 moves the watercraft lifting system 100 from the upright configuration to the stowed configuration, or vice-versa.

The base assembly 106 includes base frame members 122 arranged to support the intermediate frame assembly 104. First clamps 124 are attached to the base frame members 122 to distribute load thereto. In addition, second clamps 126 are arranged to couple the base frame members 122 to the support assembly 108. The first and second clamps, 124, 126, which are described in more detail below, permit load to be transferred through the various frame assemblies without necessitating any local, structural reinforcement of the extruded frame members. Advantageously, this permits the various frame members to be made using lighter and thinner-walled materials.

The support assembly 108 includes the structure for leveling and supporting the watercraft lifting assembly 100 such as when a watercraft vehicle is being deployed into or removed from the water. In the illustrated embodiment, the support assembly 108 includes stanchions 128 adjustably received within sleeves 130 and coupled to base plates 132. Support members 133 engage the sleeves 130 and are configured to also receive the second clamps 126.

Figure 3:
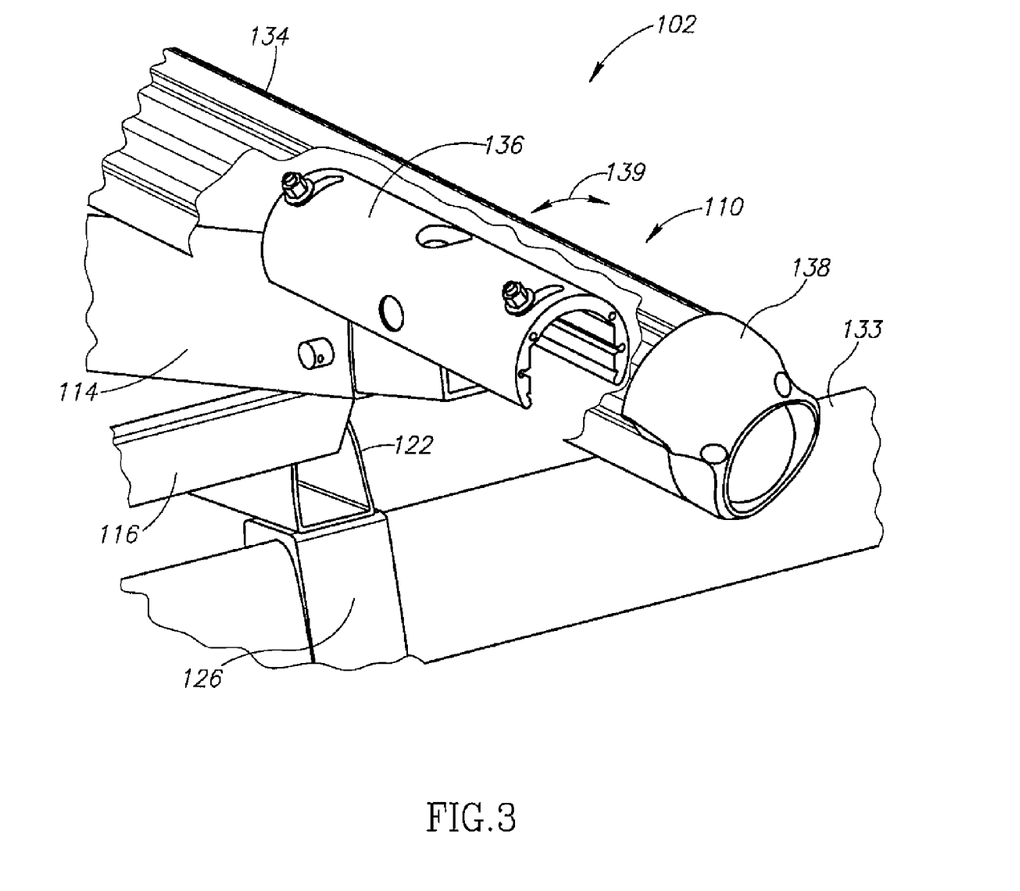
FIG. 3 is a perspective, cut-away view of a bunk rail assembly coupled to a load distribution member according to an embodiment of the present invention.
Figure 4:
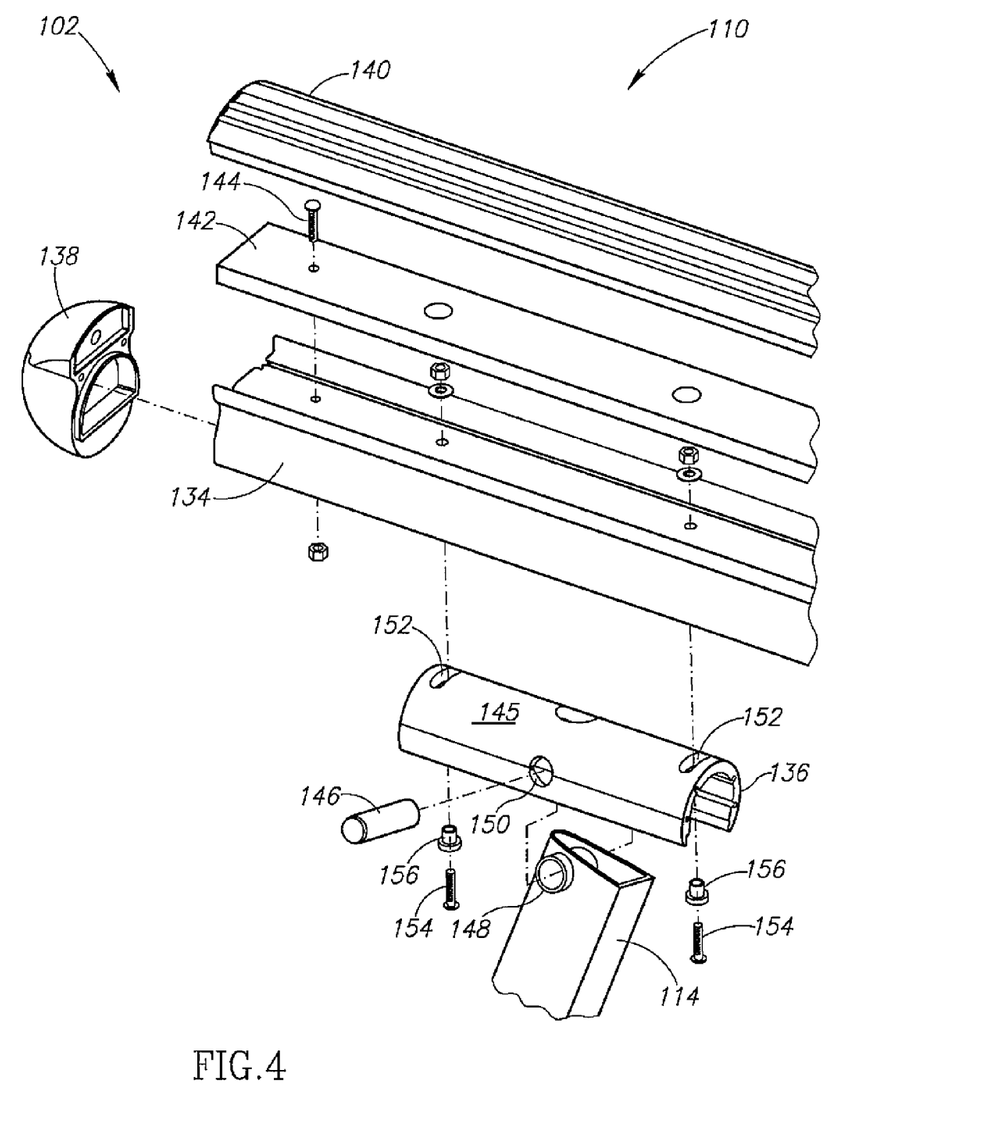
FIG. 4 is an exploded view of the bunk rail assembly of FIG. 3 according to an embodiment of the present invention.

FIGS. 3 and 4 show the upper rail assembly 102 having the bunk rail assembly 110 pivotally coupled to the link 114. The bunk rail assembly 110 may include a bunk rail member 134, a load distribution member 136 and an optional end cap 138. The bunk rail 134 may take the form of an extruded or monolithic component having an inner surface that is complementarily shaped and closely receives the load distribution member 136. In addition and as explained in greater detail below, the bunk rail 134 may be coupled to the load distribution member 136 such that the bunk rail 134 may freely rotate over at least a limited range as indicated by arrow 139 when the bunk rail 134 comes into contact with a hull of a watercraft (not shown).

Referring to FIG. 4, a bunk cushion 140 is slideably coupled to the rail 134 and forms a channel therewith in which a reinforcement board 142 may be located. In the illustrated embodiment, the reinforcement board 142 is fixed to the rail 134 with fasteners 144. By way of example, the bunk cushion 140 may take the form of an extruded, elastomeric material while the reinforcement board 142 may take the form of a wood, wood composite, or other durable, yet sufficiently rigid material. The bunk cushion 140 may be grooved or ribbed on its outer surface to help prevent sliding when in contact with the hull of the watercraft. The end cap 138 is configured to engage the rail 134, the bunk cushion 140 and the board 142. In one embodiment, the end cap 138 may be bonded to one or more of the aforementioned components.

The load distribution member 136 operates to distribute load (i.e., weight or other forces) from the bunk rail 134 into the intermediate frame assembly 104 (FIG. 1) by way of links 114. The distribution of load through the load distribution member 136 may advantageously permit the bunk rail 134 to have a constant and uniform cross-sectional shape and therefore not require any structural build-up or padding local to or in vicinity of its connection with the links 114. In turn, the use of the load distribution member reduces the structural complexity and cost of the rail 134. As mentioned above, the load distribution member 136 also provides a bearing surface 145 on which the rail 134 can rotate. The bearing surface 145, as well as the inner surface of the rail 134, may be coated or otherwise treated to resist wear.

In the illustrated embodiment, the load distribution member 136 is pin-connected to the link 114 with a pin 146 received in a link bore 148 and further received in a bore 150 of the load distribution member 136. The pin-connection permits the link 114 to move relative to the rail 134 as the watercraft lift system 100 (FIG. 1) transitions from the upright configuration (FIG. 1) to the stowed configuration (FIG. 2). Slots 152 located on an upper portion of the load distribution member 136 allow for the limited rotation of the rail 134 relative to the load distribution member 136. A fastener assembly that includes a threaded fastener 154 and a bushing 156 may be used to couple the rail 134 to the load distribution member 136. In the illustrated embodiment, the fastener assembly cooperates with the slot 152 to structurally limit the rotation of the rail 134 relative to the load distribution member 136. It is appreciated that the slot and fastener assembly may be replaced with other types of rotational restraint designs, such as structural stops attached to or integrally formed with the rail 134 and arranged to contact the link 114 after the rail has rotated a desired amount.

Figure 5A:
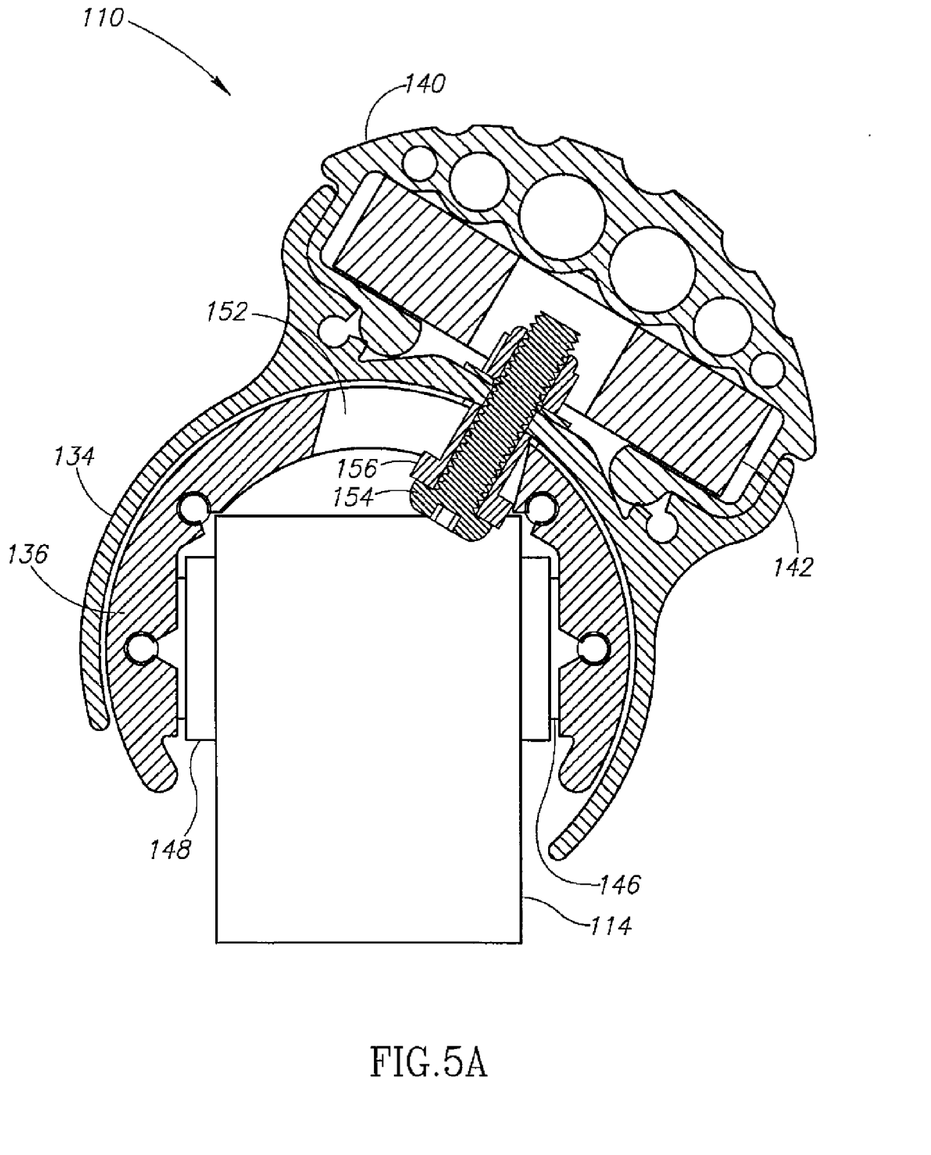
FIG. 5A is a cross-sectional view of the bunk rail assembly of FIG. 4 with the rail rotated with respect to the load distribution member in a first direction according to an embodiment of the present invention.
Figure 5B:
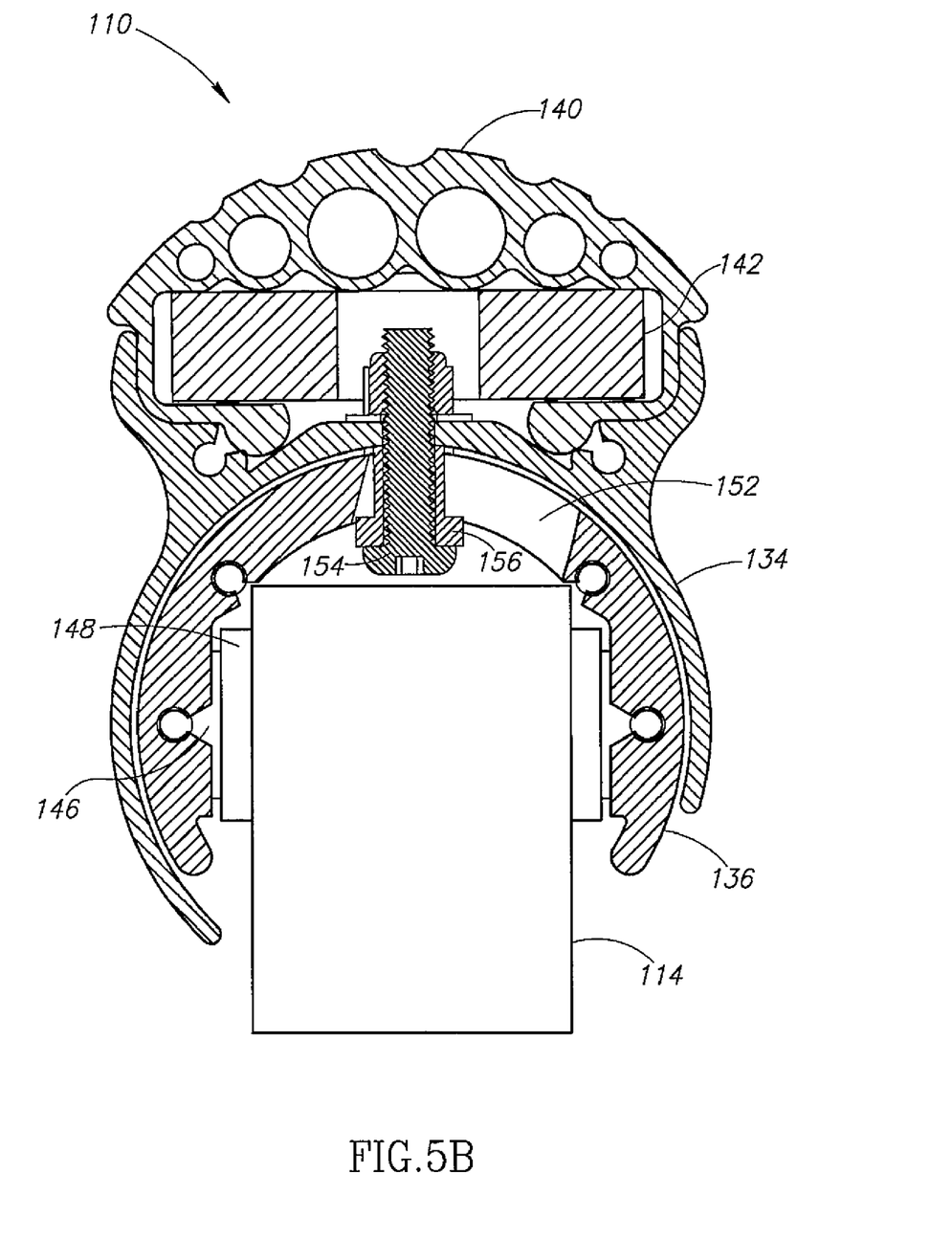
FIG. 5B is a cross-sectional view of the bunk rail assembly of FIG. 4 with the rail rotated with respect to the load distribution member in a second direction according to an embodiment of the present invention.

FIGS. 5A and 5B show a cross-sectional view of the bunk rail assembly 110, which best shows the structural interaction between many of the aforementioned components. Of particular interest, the cross-sectional shapes of the bunk rail 134 and the bunk cushion 140 cooperate to form the channel 157 for the reinforcement member 142. In addition, the cross-sectional shape of the rail 134 permits the bunk cushion 140 to be slideably received and retained.

FIGS. 5A and 5B also show the rotational range of motion permitted by the slot and fastener assembly. Specifically, FIG. 5A shows the rail 134 rotated to a first stopped position where the bushing 156 contacts the load distribution member 136. Likewise, FIG. 5B shows the rail rotated to a second stopped position.

Figure 5C:
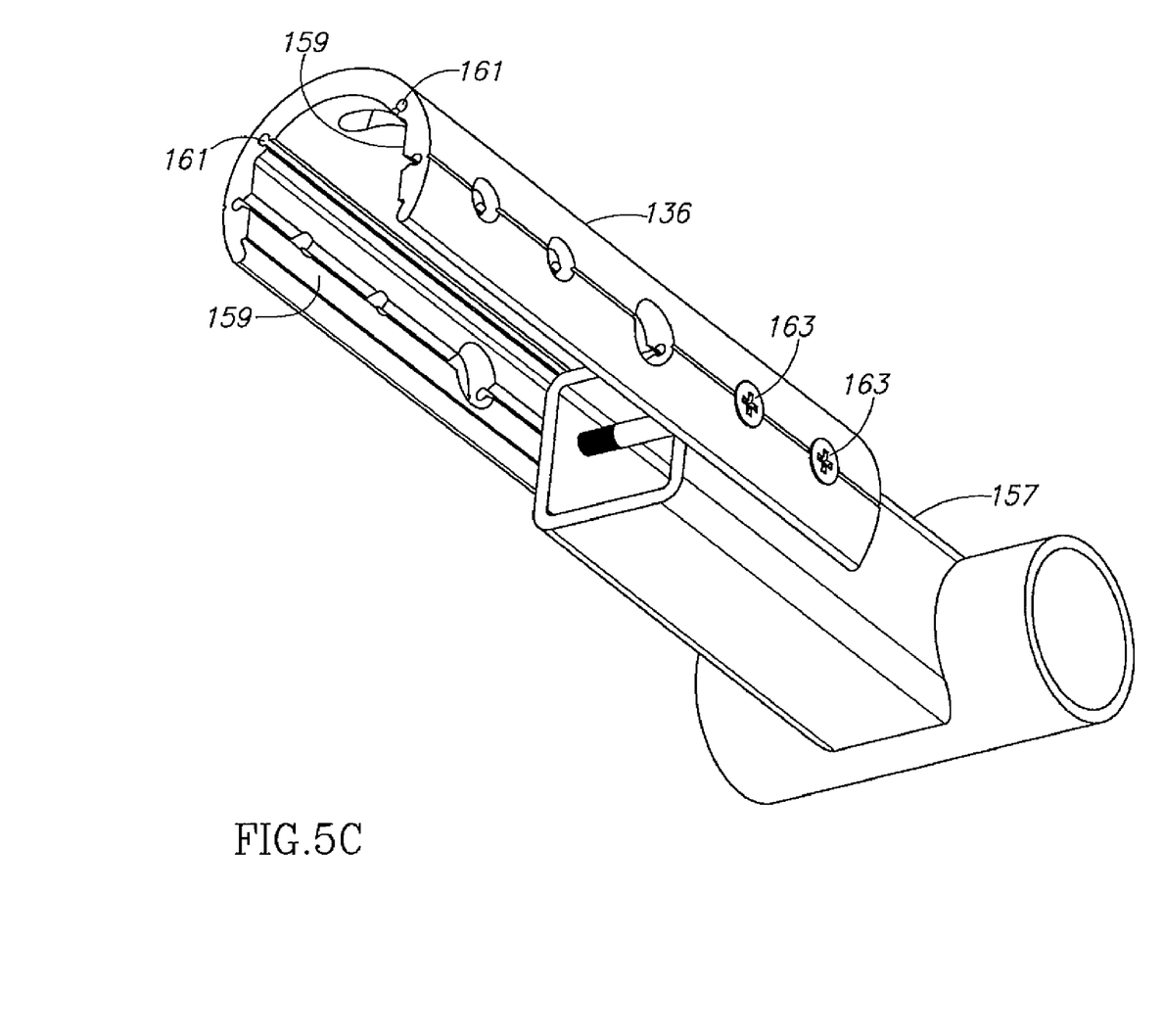
FIG. 5C is a perspective view of a load distribution member engaging an accessory component according to an embodiment of the present invention.

FIG. 5C shows the load distribution member 136 coupled to an accessory component 157. The load distribution member 136 includes one or more flats 159 that form at least a portion of its inner surface. In addition, the load distribution member 136 further includes longitudinal grooves or channels 161. In the illustrated embodiment, the accessory component 157 includes a square or rectangular profile and is sized to be closely received by the flats 159. Fasteners 163 may be used, but may not be necessary, to secure the accessory component 157 to the load distribution member 136. The flats 159, the channels 161 or both may be utilized to receive and secure the accessory component 157. Both features may also advantageously provide a means of anti-rotation, thus preventing the accessory component 157 from rotating relative to the load distribution member 136. Further, the ability to couple the accessory component 157 directly to the load distribution member 136 permits forces from the accessory component 157 to be transferred into the load distribution member 136 while bypassing the bunk rail assembly 102. By way of example and briefly referring back to FIG. 1, the hull supports 112 may be coupled to the load distribution members 136 as discussed above, which in turn means bending loads induced in the hull supports 112 could be reacted by the load distribution members 136 instead of the bunk rail 134 (FIG. 3).

Figure 6:
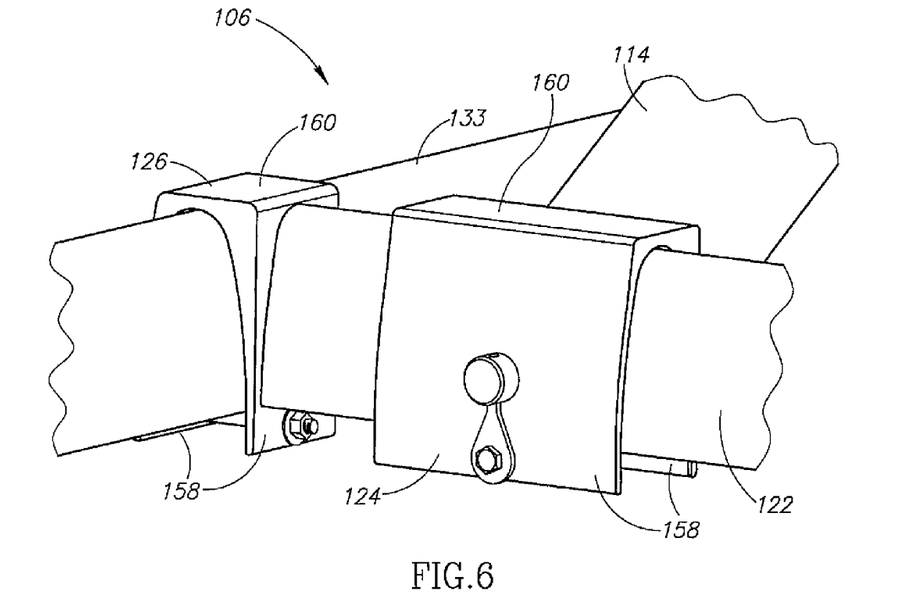
FIG. 6 is a perspective view of a contoured clamping system applied to the watercraft lifting system of FIG. 1 according to an embodiment of the present invention.

FIG. 6 shows the first and second clamps 124, 126 secured respectively to frame members 122 and 133. In the illustrated embodiment, a load path of the frame assembly may be through the link 114, a load transferring member, into the clamp 124, then into the frame member 122 where the load is beamed over to the clamp 126, which in turn transmits the load into the frame member 133 and finally into the stanchions 128 and base plates (FIG. 1). Some frame members, such as frame member 122, may function as both a load receiving member and a load transferring member. The clamps 124, 126 operate as load distribution devices to eliminate a direct load transfer between frame members.

Figure 7:
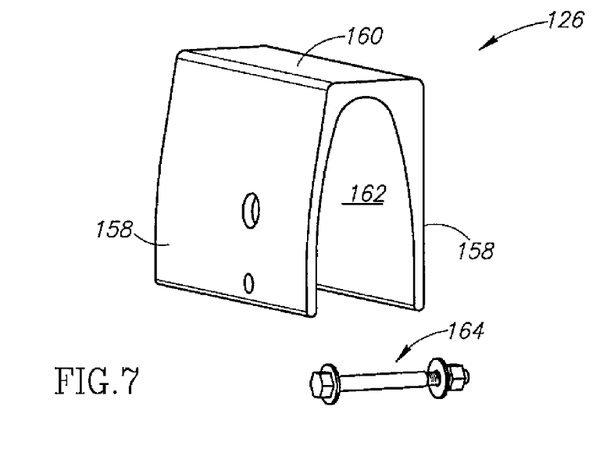
FIG. 7 is a perspective, exploded view of one of the clamps of FIG. 6.

FIG. 7 shows the clamps 124, 126 having opposing flanges 158 that extend from a base (e.g., upper) portion 160. Each clamp 124, 126 includes an inner surface 162 defined by the flanges 158 and base portion 160 such that the inner surface 162 is complementarily shaped to closely nest with an outer contoured surface of a respective frame member (FIG. 6). In addition, the clamps 124, 126 may include a tensioning assembly 164, which may take the form of a bolt, washer and nut assembly. By way of example, the tensioning assembly 164 operates to urge or clamp the opposing flanges 158 toward one another and correspondingly provide a contact pressure between the inner surface 162 of the clamp 126 and the outer contoured surface of the frame member 133. In one embodiment, the inner surface 162 of the clamp 126 includes a parabolically-shaped surface that corresponds to a similarly contoured surface of the respective member. However, the inner surface 162 may have a variety of contours, which generally will have some type of taper or curvature to permit a close fit and sufficient load distribution with the frame member. For example, the sufficient load distribution may include the clamp cooperating with the frame member to distribute load approximately over the length of the clamp. The inner surface 162 may also function as a bearing or wear surface. Thus, the close nesting of the respective clamp and frame member surfaces may advantageously reduce friction between the surfaces when the watercraft lifting system is being utilized.

Figure 8:
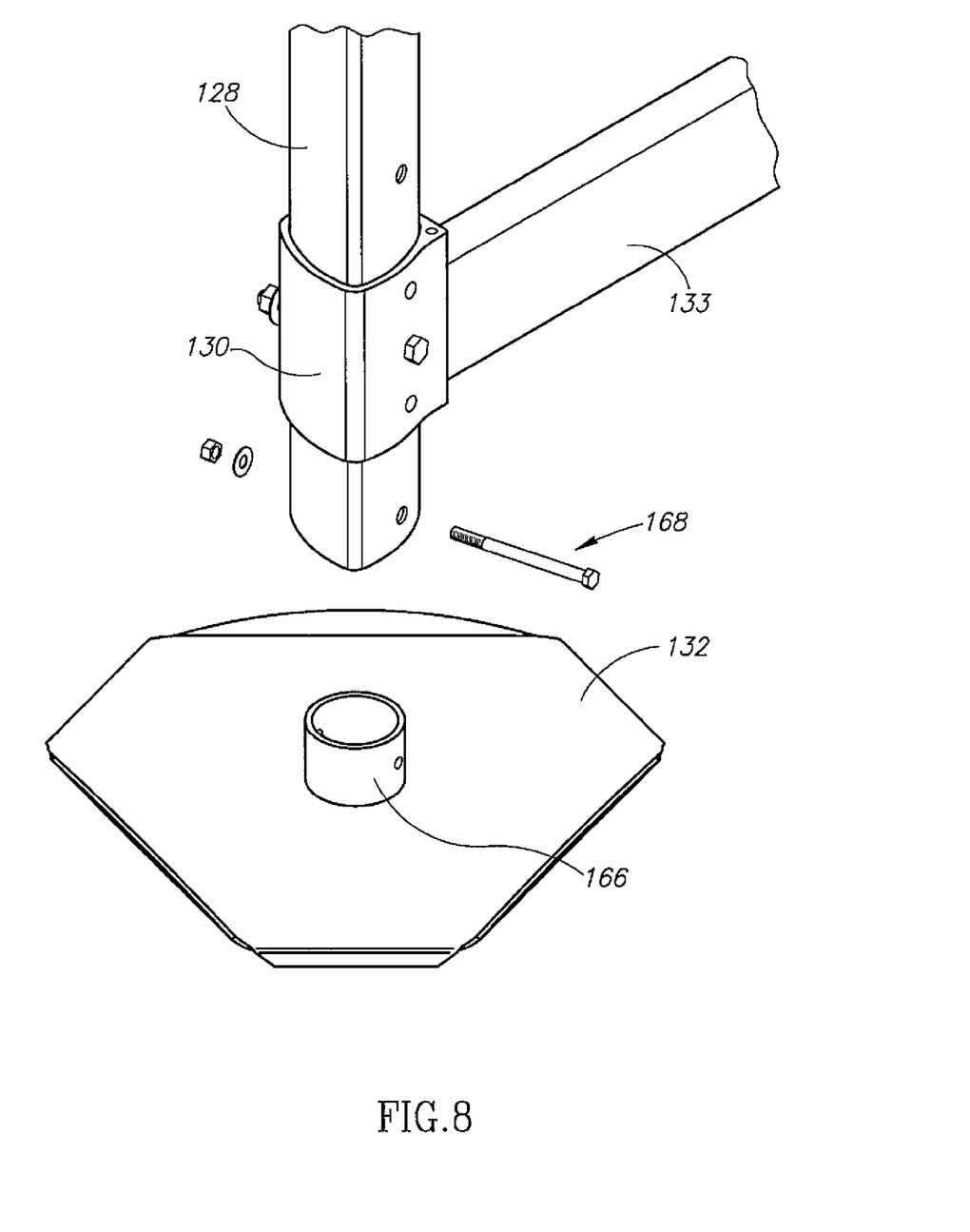
FIG. 8 is a perspective view of a stanchion-to-base plate assembly for a watercraft lifting system according to an embodiment of the present invention.
Figure 9:
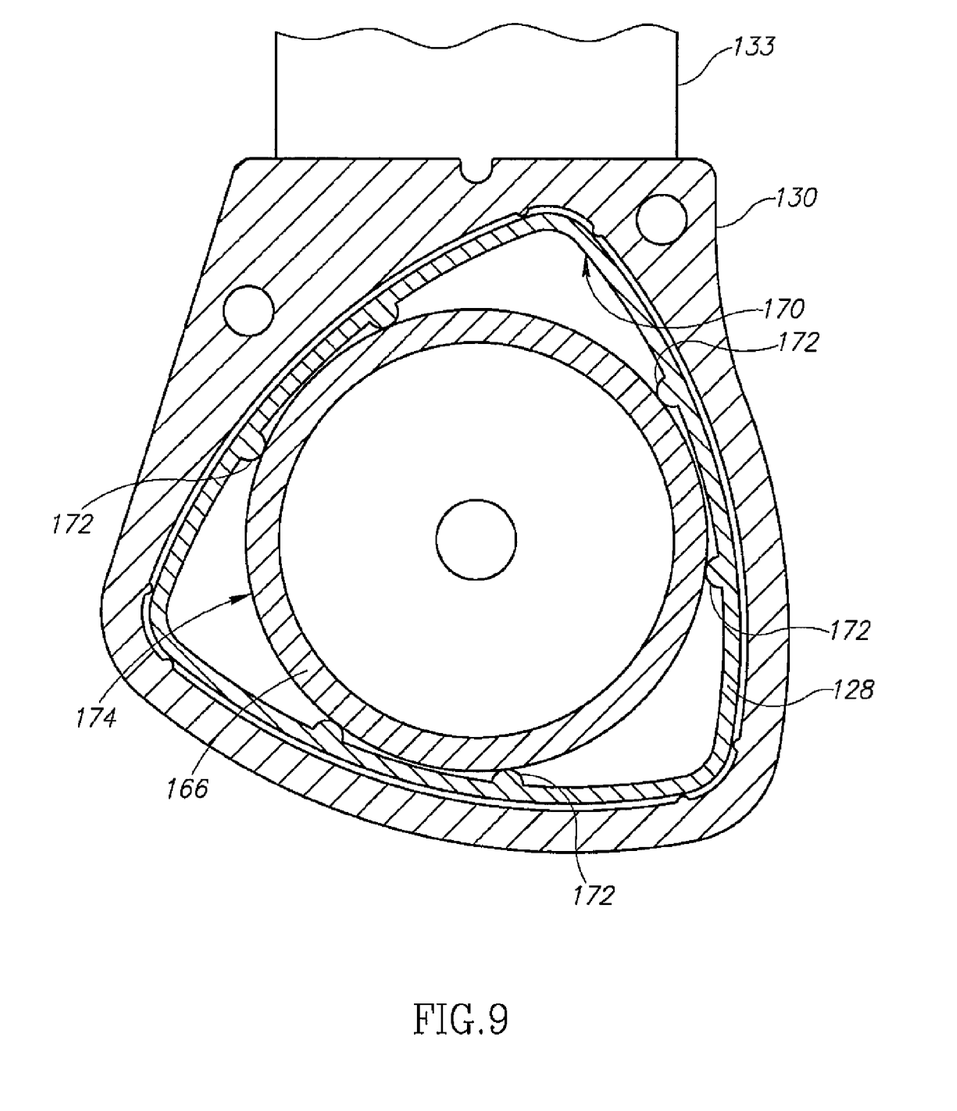
FIG. 9 is a bottom, plan view of the stanchion-to-base plate assembly of FIG. 8 with the base plate removed according to an embodiment of the present invention.

FIGS. 8 and 9 show the support assembly 108 having the leveling and supporting structure for the watercraft lifting assembly 100. In the illustrated embodiment, the stanchion 128 is fixed to a tubular member 166 extending from the base plate 132 with a fastener assembly 168. Referring to FIG. 9, the stanchion 128 includes a non-circular cross-section, which takes the form of a triangular cross-section in the illustrated embodiment, and an inner surface 170 includes a plurality of protuberances 172 sized to closely receive the circular outer surface 174 of the tubular member 166. The protuberances 172 may take the form of semi-circular bumps according to one embodiment. The protuberances 172 permit a non-circular cross-sectional structural member (e.g., the stanchion 128) to securably receive and join with a substantially circular cross-sectional structural member (e.g., the tubular member 166).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined by reference to the claims that follow.

The embodiments of the invention in which an exclusive property or privilege is claimed are defined as follows:

1. A lifting system for watercraft, comprising:
   a base assembly;
   a ground support assembly for supporting the base assembly at a desired location;
   a frame assembly defining a plurality of attachment locations, where the frame assembly is supported by the base assembly for rotation between first and second positions relative to the base assembly;
   an actuator operatively connected to the frame assembly such that the extension and retraction of the actuator causes the frame assembly to move between the first and second positions;
   first and second bunk rail assemblies, where each bunk rail assembly comprises
      a plurality of load distribution members each defining a bearing surface and at least one slot;
      a rail member defining an inner surface, where
         the inner surface envelops the plurality of load distribution members such that
            the plurality of load distribution members are spaced from each other, and
            the bearing surfaces of the plurality of load distribution members engage the inner surface of the rail member such that loads on the rail are transferred to the plurality of load distribution members,
         the bearing surfaces of the plurality of load distributions and the inner surfaces of the rail member are configured such that the rail member is capable of rotating relative to the plurality of load distribution members, and
      a pin associated with each attachment locations, where each pin rotatably connects the attachment locations to one of the plurality of load distribution members; and a bolt assembly associated with each of the slots in the plurality of load distribution members, where each bolt assembly extends through the slot associated therewith to attach the load distribution members to the rail member without interfering with rotation of the rail member relative to the plurality of load distribution members.

2. A lifting system as recited in claim 1, in which the base assembly comprises:
first and second frame members defining outer surface portions having a first shape;
third and fourth frame members;
first, second, third, and fourth clamp members defining inner surface portions having a second shape, where the first shape is complementarily to the second shape; whereby
the first and second clamp members are secured to the third frame member;
the third and fourth clamp members are secured to the fourth frame member;
the inner surface portions of the first and second clamp members are arranged to engage the outer surface portion of the first frame member; and
the inner surface portions of the third and fourth clamp members are arranged to engage the outer surface portion of the second frame member.

3. A lifting system as recited in claim 2, in which:
the first and second frame members are formed by sections of a first type of extruded member; and
the first, second, third, and fourth clamp members are formed by sections of a second type of extruded member.

4. The lifting system of claim 3, in which the first and second types of extruded members are formed of aluminum.

5. A lifting system as recited in claim 2, in which:
the frame assembly comprises
first, second, third, and fourth links, and
fifth, sixth, seventh, and eighth clamp members each defining inner surface portions having the second shape, where the fifth, sixth, seventh, and eighth clamp members are rotatably attached to the first, second, third, and fourth links, respectively; whereby
the third and fourth frame members define outer surface portions having the first shape;
the inner surface portions of the fifth and sixth clamp members are arranged to engage the outer surface portion of the third frame member; and
the inner surface portions of the seventh and eighth clamp members are arranged to engage the outer surface portion of the fourth frame member.

6. A lifting system as recited in claim 5, in which:
the first, second, third, and fourth frame members are formed by sections of a first type of extruded member; and
the first, second, third, fourth, fifth, sixth, seventh, and eighth clamp members are formed by sections of a second type of extruded member.

7. The lifting system of claim 6, in which the first and second types of extruded members are formed of aluminum.

8. The lifting system of claim 5, in which the first, second, third, and fourth links define each define one of the plurality of attachment locations.

9. A lifting system as recited in claim 8, in which:
a pair of link holes is formed in the links at each of the attachment locations; and
a pair of distribution member holes is formed in each of the plurality of distribution members; whereby
each of the pins extend through one of the pairs of link holes and one of the pairs of distribution member holes.

10. A lifting system as recited in claim 1, in which each of the bunk rail assemblies comprises a cushion member supported by one of the rails.

11. A lifting system as recited in claim 1, in which:
the rail members each define a channel; and
each of the bunk rail assemblies comprises
a reinforcement board, and
a cushion member; whereby
the reinforcement boards secure the cushion members relative to the rails.

12. A lifting system as recited in claim 1, in which:
the load distribution members are formed by sections of a first type of extruded member; and
the rail members are formed by sections of a second type of extruded member.

13. The lifting system of claim 12, in which the first and second types of extruded members are formed of aluminum.

14. A lifting system as recited in claim 3, in which:
the load distribution members are formed by sections of a third type of extruded member; and
the rail members are formed by sections of a fourth type of extruded member.

15. The lifting system of claim 14, in which the first, second, third, and fourth types of extruded members are formed of aluminum.

16. A lifting system as recited in claim 5, in which:
the load distribution members are formed by sections of a third type of extruded member; and
the rail members are formed by sections of a fourth type of extruded member.

17. The lifting system of claim 16, in which the first, second, third, and fourth types of extruded members are formed of aluminum.

* * * * *